United States Patent [19]

Clapper et al.

[11] Patent Number: 4,663,076

[45] Date of Patent: May 5, 1987

[54] INVERT EMULSION DRILLING FLUID COMPRISING OLIGAMIDE COMPOSITION

[75] Inventors: Dennis K. Clapper; Alphonse C. Perricone, both of Houston; Darrell P. Salisbury, Sugarland, all of Tex.

[73] Assignee: Milchem Incorporated, Houston, Tex.

[21] Appl. No.: 748,919

[22] Filed: Jun. 26, 1985

Related U.S. Application Data

[62] Division of Ser. No. 609,025, May 10, 1984, Pat. No. 4,575,428.

[51] Int. Cl.$^4$ ................................................ C09K 7/06
[52] U.S. Cl. ................................ 252/356; 252/8.511; 252/357; 260/404.5
[58] Field of Search .......... 252/356, 357, 321, 8.55 R, 252/8.5 P, 8.5 M; 260/404.5

[56] References Cited

U.S. PATENT DOCUMENTS

| | | | |
|---|---|---|---|
| 2,946,746 | 7/1960 | Keller | 252/8.5 |
| 2,999,063 | 9/1961 | Hoeppel | 252/8.5 |
| 3,169,113 | 2/1965 | Kirkpatrick et al. | 252/8.55 |
| 3,654,177 | 4/1972 | Foley | 252/309 X |
| 4,436,636 | 3/1984 | Carnicum | 252/8.5 |

*Primary Examiner*—John F. Terapane
*Assistant Examiner*—Catherine S. Kilby
*Attorney, Agent, or Firm*—Norvell & Associates

[57] ABSTRACT

The present invention relates to a surfactant for use in invert emulsion drilling fluids, the invert emulsion drilling fluid produced therefrom, and a method of drilling, completing and working over a subterranean well utilizing said drilling fluid. The drilling fluid comprises an emulsion formed by producing a diamide having from between about 20 mole percent and about 35 mole percent of a polyamine, and from between about 30 mole percent and about 70 mole percent of a fatty acid having from between about 6 to about 20 carbon atoms therein, the diamide thereafter being further reacted with from between about 15 mole percent and about 35 mole percent of a tricarboxylic acid. The total amine value of said oligamide being from between about 10 to about 30, and the acid value of said oligamide being from between about 26 to about 46. When the surfactant is diluted to about 70 w/w percent concentration with a suitable solvent, the $ES_3$, as defined herein, of said emulsion drilling fluid will exceed about 400 volts, the $ES_5$, as defined herein, will be greater than the $ES_4$, and the $ES_5$ will be greater than about 1,000 volts. Alternatively, the electrical stability of the emulsion drilling fluid, when using the API Electrical Stability Test, should be at least about 1,000 volts.

8 Claims, No Drawings

INVERT EMULSION DRILLING FLUID COMPRISING OLIGAMIDE COMPOSITION

This is a division of application Ser. No. 609,025, filed May 10, 1984, now U.S. Pat. No. 4,575,428.

BACKGROUND OF THE INVENTION

1. Field of the Invention

The present invention relates to drilling fluids utilized in the drilling of subterranean oil and gas wells. In particular, the invention relates to a surfactant for use in invert emulsion, or preparing water-in-oil emulsion, drilling fluids and the method of their use.

2. Brief Description of the Prior Art

It is generally agreed among those skilled in the art that a rotary system is the most acceptable form of drilling a subterranean well. This system depends upon the rotation of a column of drill pipe to the bottom of which is attached a multi-pronged drilling bit. The bit cuts into the earth, causing the cuttings to accumulate as drilling continues. As a result, a drilling fluid must be used to carry these cuttings to the surface for removal, thus allowing the bit to continue functioning, and the bottom hole to be kept clean and free of cuttings at all times. Drilling systems other than the rotary system are sometimes employed in drilling operations. Nevertheless, these systems still require a drilling fluid to remove borehole cuttings, and to otherwise perform functions related to drilling fluids. In many instances, what is generally referred to as a "drilling fluid" actually may be utilized, with either no modification, or only minor modification, as a fluid for use in conjunction with completing or working over a subterranean well. In this regard, utilization of the phase "drilling fluid" herein contemplates the utilization of such fluid in such completion and workover operations in subterranean wells, as well as in drilling operations.

Although aqueous-based drilling fluids which utilize clear water, brine, saturated brine, or sea water as the primary liquid base, may be found to be dominant within some facets of the drilling industry, there is a considerable need for drilling fluids wherein a hydrocarbon liquid forms the major liquid constituent, particularly in instances in which the drilling fluid is utilized in the higher temperature wells which are drilled to the more substantial depths.

Hydrocarbon-based drilled fluids normally are defined as invert emulsion, or water-in-oil emulsion, drilling fluids. These emulsions provide droplets of water which typically are dispersed in a continuous phase of oil. The oil, or continuous phase, typically will comprise a hydrocarbon, such as mineral oil, diesel oil, crude oil, kerosene, or the like. The amount of oil used typically will be within the range of about 60 to about 95 parts by volume, and preferably within the range of about 70 to about 90 parts by volume, on the basis of 100 parts equalling the liquid phase of the drilling fluid. At the higher level of the range, a drilling fluid with a comparatively lower viscosity will be produced, while drilling fluids having a lesser amount of oil will produce a comparatively higher viscosity fluid. The concentration of the selected hydrocarbon depends upon the particular application for which the water-in-oil drilling fluid is to be utilized.

The dispersed liquid phase of the drilling fluid is normally referred to as the "water phase" and may consist of fresh water, salt water, sea water, or saturated brine. Normally, the presence of typical amounts of sodium chloride, calcium chloride, calcium carbonate, or calcium sulphate salts will have little significant effect on the stability of the emulsion which is typically produced. The water concentration should be in the range from between about 5 to about 40 parts by volume, and, typically, will be within the range of about 10 to about 30 parts by volume, on the basis of 100 parts equalling the liquid phase of the drilling fluid composition. Again, the exact concentration depends upon the particular application for which the invert emulsion drilling fluid is to be utilized.

Imidazoline-containing compositions long have been commercially utilized as wetting agents in shampoos and soaps. For example, imidazoline salts are disclosed for utilization in such compositions in U.S. Pat. No. 3,071,590, entitled "Condensation Products of Formaldehyde, Primary Amines and Ketones". Additionally, imidazolines, such as those taught in U.S. Pat. No. 3,654,177, entitled "Emulsifier Composition" have been found to be useful in preparing emulsifiers for certain water-in-oil emulsions for cutting oils, hydraulic fluids, lubricants, cosmetics, agricultural emulsions, and in invert drilling fluids for subterranean wells. Similar materials also are disclosed in U.S. Pat. No. 2,999,063, entitled "Water-in-Oil Emulsion Drilling and Fracturing Fluid".

When a polyamine and a fatty acid are reacted at temperatures of about 180° C., and water extraction permits ring closure, the reaction is driven to completion and an imidazoline intermediate or final product (depending upon further stages in the reaction) is produced. If the reaction is conducted at somewhat reduced temperatures of between about 160° C. to about 175° C. and approximately one mole of water is distilled for each mole of fatty acid introduced into the formulation, ring closure will be prevented, and an amide will be produced, as opposed to a true imidazoline, or an imidazoline in conjunction with numerous reaction mixtures. Accordingly, when utilized herein, the word "diamide" contemplates the reaction of a polyamine with approximately two moles of fatty acid at such temperature and under such conditions that the total reaction required to form a product with complete ring closure is not complete and an imidazoline or imidazoline and reaction product mixtures, are not formed. Those skilled in the art can easily prepare a diamide, such as that disclosed in U.S. Pat. No. 3,134,759, entitled "Tall Oil Amide for Inhibiting Corrosion," which teaches the preparation of such amides as well as their use as a corrosion inhibitor.

Hydroxyethylacetamides and ethoxylated hydroxyethyl acetamides have been utilized as emulsifiers in water-in-oil drilling fluids, as shown in U.S. Pat. No. 3,125,517, entitled "Invert Emulsion Drilling Fluid."

Certain imidazoline salts have also been suggested for use in drilling fluids. For example, U.S. Pat. No. 3,514,399, entitled "Drilling Fluids Containing Imidazoline Salts," discloses the use of a mixed dimer acid-monocarboxylic acid salt of an imidazoline in drilling fluids as a borehole stabilizer.

Certain amines and amides within specific reactions have also been disclosed and utilized in water-in-oil emulsion drilling fluids, such as U.S. Pat. No. 3,041,275, entitled "High Temperature Emulsion Drilling Fluid." Finally, certain polyamides without the incorporation of an acid, particularly without an incorporation of a tricarboxylic acid, have been utilized as water-in-oil emulsion fracturing fluids, such as in U.S. Pat. No. 3,169,113, entitled "Emulsifier Compositions and Uses Thereof."

It has been found that a more economical, more stable water-in-oil surfactant will result from the preparation and utilization of a surfactant composition comprising: from between about 20 mole percent and about 35 mole percent of a polyamine; from between about 30 mole percent and about 70 mole percent of a fatty acid having from between about 6 carbon atoms and about 20 carbon atoms therein, and from about 15 mole percent to about 35 mole percent of a tricarboxylic acid.

It should be noted that the composition of the surfactant will always be expressed in terms of the total formulation. When the end product is diluted to 70 w/w percent concentration with a suitable solvent, the surfactant will have an acid value of from between about 26 to about 46, and a total amine value of from between about 10 to about 30. Again, all acid and amine values are given for 70 w/w percent solutions of the surfactant.

The electrical stability of the emulsion produced with the surfactant will exceed about 400 volts at $ES_3$ as defined hereafter, and $ES_5$ will be greater than $ES_4$, the $ES_5$ being greater than about 1,000 volts. Alternatively, the electrical stability of an emulsion drilling fluid, when using the API Electrical Stability Test should be at least about 1,000 volts.

SUMMARY OF THE INVENTION

The present invention relates to the preparation and utilization of a unique composition which is useful as a surfactant for the wetting and dispersion of drill solids or weighting material and formation of water-in-oil drilling fluids for subterranean wells. the primary function of the surfactant is its use in preparing a drilling fluid having a relaxed filtrate for improved penetration rates.

One advantage of the present invention is that, when used at lower concentrations than other surfactants, it produces a tighter and thermally stable emulsion, as evidenced by the lack of free water in the HIGH TEMPERATURE HIGH PRESSURE (HTHP) filtrates. The result of lower treatment levels is a more cost-effective surfactant. A secondary function is wetting and dispersion of incorporated solids such as barite in relaxed or controlled filtrate drilling mud systems. The present invention can be used in conjunction with other primary emulsifiers, such as tall oil soaps, etc. in the controlled filtrate system. The effectiveness of the present invention as a wetting agent can be best measured by its ability to support barite in a mud system after high temperature aging.

The surfactant composition of the present invention comprises from between about 20 mole percent and about 35 mole percent of a selected polyamine; from between about 30 mole percent to about 70 mole percent of a selected fatty acid having from between about 6 and about 20 carbon atoms; and from between about 15 mole percent and about 35 mole percent of a selected tricarboxylic acid.

In a preferred formulation, the surfactant is prepared by reacting the polyamine and the fatty acid in conventional fashion at a comparatively low temperature, i.e., about 165° C., and sufficient water is driven off such that the resulting end product does not form an imidazoline. However, the product of the reaction of polyamine and fatty acid may contain some imidazoline. The preparation of the diamide with no imidazoline is more economical and therefore is preferred.

The intermediate diamide product is finally reacted, conventionally, with a selected tricarboxylic acid, for crosslinking purposes, wherein an improved and stabilized surfactant is produced.

The acid value of the oligamide surfactant should be from between about 26 and about 46 and the amine value should be between about 10 and about 30. However, the acid value for a preferred surfactant formulation should be between about 36 to about 46, and the amine value should be between about 10 to about 20.

The surfactant is utilized to prepare a water-in-oil emulsion drilling fluid by utilization of a selected hydrocarbon, such as mineral oil, diesel, or the like, and a water phase, such as sea water or a saturated brine, each in pre-selected proportions. Thereafter, other conventional constituents may be added in desired amounts. The prepared emulsion fluid should have an Electrical Stability at "$ES_3$," as defined herein, of at least about 400 volts, the "$ES_5$" being greater than the "$ES_4$," the "$ES_5$" being greater than about 1,000 volts. Alternatively, the electrical stability of an emulsion drilling fluid, when using the API Electrical Stability Test should be at least about 1,000 volts.

DESCRIPTION OF THE PREFERRED EMBODIMENTS

In the preparation of the surfactant and emulsion composition utilized in the present invention, a polyamine is reacted with a fatty acid. From between about 20 mole percent and about 35 mole percent of a selected polyamine will be utilized, with 100% representing the entire, finished, surfactant product. Typically, the preferred polyamine content will be about 30 mole percent. However, the amount of the selected polyamine may, in fact, depend upon the particular polyamine so selected, as well as the particular fatty acid and amount thereof which is utilized in the reaction. The fatty acid utilized in the reaction will be in an amount of from about 30 mole percent to about 70 mole percent, with about 50 mole percent typically being preferred. Again, the amount of the selected fatty acid will, of course, depend upon the selected fatty acid itself, as well as the amount of the selected particular polyamine in the composition.

The polyamine selected for utilization in the prepared intermediate diamide of the present invention can include, for example, diethylenetriamine (hereinafter referred to as "DETA"), triethylenetetramine, tetraethylenepentamine, dipropylenetriamine, tripropylenetetramine, and higher homologues thereof. These polyalkylene polyamines typically contain two or more alkylene groups separated by nitrogen atoms.

In an amidification reaction, the condensation reaction of the polyamine may take place either at the primary or the secondary groups. The diamide will consist of a mixture of molecules in which any two of the amino groups have condensed with fatty acid.

In the preparation of the diamide, a fatty acid containing from between about 6 to about 20 carbon atoms may be utilized. Such acids include octanoic, myristic, stearic, oleic, linoleic, linolenic, and mixtures thereof, such as "tall" oil which typically is a mixture of rosin acids and fatty acids.

After preparation of the intermediate diamide product, as particularized below, the diamide is caused to be further reacted with a tricarboxylic acid, such as citric or trimellitic. The amount of the selected tricarboxylic acid utilized in the final product will vary, depending upon the amount and particular selected reactants utilized to prepare the particular diamide, as well as the selected tricarboxylic acid, itself. However, the selected tricarboxylic acid should be present in the end surfactant product in an amount from between about 15 mole percent to about 35 mole percent.

In preparing a satisfactory surfactant of the present invention for utilization in the preparation of a drilling fluid, it has been found that a determination of acid value at an appropriate point during the reaction, as described below, will serve as a useful indication of the extent of the reaction. An acid value from between about 26 to about 46 will indicate the quantity of unreacted carboxyl groups in the product, thus assuring that the surfactant will have the appropriate molecular weight and the hydrophylic-hydrophobic characteristics of the surfactant will be within a satisfactory and desired range. The total amine value should be from between about 10 to about 30.

The acid value can be calculated by weighing approximately 3 grams of the given oligamide composition into a 300 cm$^3$ beaker. Exactly 100 cm$^3$ of methanol is dissolved therein, such as by warming, or by agitation. A pH meter is standardized with a buffer pH 7 and pH 10. The electrode is then rinsed with water and methanol. The beaker is placed on a stir plate and the lower half of each electrode is immersed in the beaker. A burette tip is positioned close to the surface of the solution and a stir bar is provided for vigorous agitation. The initial pH is recorded. Thereafter, 0.5 cm$^3$ amount of methanolic potassium hydroxide is added. The volume of potassium hydroxide which is added and the pH which is obtained is recorded until a pH of 8 is reached. Thereafter, 0.1 cm$^3$ portions of potassium hydroxide are incrementally added until each addition exceeds a 0.3 pH unit change. Thereafter, 0.05 cm$^3$ portions of potassium hydroxide are added until the inflection point is exceeded. The titration is ended at pH 12, or higher. A plot is prepared plotting pH against cubic centimeters of potassium hydroxide solution and the inflection point is determined to the nearest 0.1 cm$^3$ of potassium hydroxide. The inflection point is a point of maximum pH change per 0.1 cubic centimeters of potassium hydroxide solution and is taken as the end point.

The acid value is expressed as milligrams of potassium hydroxide per gram of sample and is calculated as follows:

$$\text{Acid Value } (AV) = \frac{V_{KOH} \times N_{KOH} \times 56.1}{Wt_{sx}}$$

Where:
$V_{KOH}$ = cm$^3$ of methanolic KOH used for titration
$N_{KOH}$ = Normality Methanolic KOH
$Wt_{sx}$ = Weight of Sample used; in grams.

The acid value is reported to the nearest 0.1 milligram.

As stated above, the acid value of the oligamide utilized as the surfactant composition of the present invention should have a value of from between about 26 to about 46, as calculated above.

In determining total amine value of the oligamide surfactant product herein, a simple titration test can be utilized. Three grams of the produced oligamide material is weighed into a 250 cm$^3$ low form beaker to which is added 90 cm$^3$ chloroform and 10 cm$^3$ isopropyl alcohol solution. The content is boiled for one minute, covered with a watch glass, and cooled to room temperature. A stir bar is inserted into the beaker and the lower half of a set of electrodes is immersed into the sample. The sample is stirred continuously, and titration is conducted with alcoholic hydrochloric acid using a millivolt scale. The millivolt reading is recorded at every 0.5 cm$^3$. In the vicinity of the end point, the millivolt reading is recorded every 0.05 cm$^3$. A plot of a graph is prepared using millivolts versus milliliters. The end point of the resulting graph is the midpoint of the inflection, in cubic centimeters. The total amine value is calculated as the number of milligrams of potassium hydroxide equivalent to the basicity in one gram of sample. The calculation is as follows:

$$\text{Total Amine Value } (TAV) = \frac{V_{HCl} \times N_{HCl} \times 56.1}{Wt_{sx}}$$

Where:
$V_{HCl}$ = cubic centimeters (cm$^3$) of alcoholic HCl required to reach the sample end point by titration
$N_{HCl}$ = normality of alcoholic HCl solution standardized with sodium carbonate to pH 3.5
$Wt_{sx}$ = sample weight used, in grams.

As stated above, the total amine value for the oligamide surfactant should be from between about 10 to about 30 when the test, as described above, is utilized.

The equipment utilized in determining emulsion stability consists of a reliable circuit using a source of variable AC current (or DC current in portable units) connected to strip electrodes. The voltage imposed across the electrodes can be increased until a predetermined amount of current flows. The measure of emulsion breakdown is indicated by current flow. Relative stability is indicated as a voltage at breakdown point. In the procedure utilizing such equipment, the electrodes are inserted into the drilling fluid sample to be tested. The voltage range multiplier which is applicable is selected. The voltage across the electrodes is increased until the instrument indicates emulsion breakdown. The voltage reading is recorded as an electrical stability number at a given temperature. Typically, this reading should be above about 1,000 volts for a laboratory-prepared emulsion mud. This test is referred to hereafter as the "API Electrical Stability Test".

A determination of emulsion stability may be utilized in a laboratory, or other convenient location, by adding 4.2 cm$^3$ of the prepared, finished surfactant to 235 cm$^3$ of the selected hydrocarbon used to prepare the water-in-oil emulsion, such as mineral seal oil. These ingredients should be stirred for 5 minutes in a mixer, such as a Hamilton Beach Model 936-2 Mixer operated at 2500 rpm with 9B29X Impeller and Mixer Cups. A total of 58.5 cm$^3$ of a 25 percent (w/w) calcium chloride solution is then added and stirred for 10 minutes. Emulsion stability is then measured utilizing a Model 23-C Emulsion Stability Meter, manufactured and sold by the Fann Instrument Company, Houston, Tex. The resulting reading is taken and is referred to as the "ES$_1$". "ES$_2$" is obtained by continuing the emulsion stability test by adding 4.0 gm of organophilic clay and continuing the mixing for 15 minutes. Emulsion stability is measured as above and the reading referred to as "ES$_2$". "ES$_3$" is obtained while continuing the test and adding 236 grams of barite corresponding to a 12 pound per gallon mud. Mixing is continued for 15 minutes, and emulsion stability is read as "ES$_3$". "ES$_4$" is obtained by continuing the test and adding to the sample 140 grams of barite corresponding to a 14 pound per gallon mud, and mixing for 10 minutes. An emulsion stability reading, ES$_4$, is measured. "ES$_5$" is obtained by continuing the test and adding 170 grams of barite corresponding to a 16 pound per gallon mud, and stirring for 10 minutes. The resulting emulsion stability measurement is indicated as "ES$_5$".

In the present invention, a satisfactory emulsion is obtained where the surfactant of the present invention is utilized in an emulsion and the "ES$_3$" exceeds about 400 volts; the "ES$_5$" is greater than the "ES$_4$" and the "ES$_5$" is greater than about 1,000 volts.

Still another criteria for determining the preparation of a satisfactory emulsion for utilization in the present invention is the high temperature filtration test and the emulsion stability of a prepared mud utilizing the surfactant of the present invention. On a commercial and field basis, the filtration and emulsion stability tests of Sections 3 and 8, respectively, of the "Standard Procedures for Testing Drilling Fluids," (RP-138, ninth edition, May, 1982) prepared by the American Petroleum Institute, can be easily utilized. The instrument utilized in the filtration test consists essentially of a controlled pressure source, a cell designed to withstand a working pressure of at least 1,000 PSI, a system for heating the cell, a suitable frame to hold the cell and heating system and a pressurized collection cell designed to withstand a working back pressure of at least 500 PSI to avoid flashing or evaporation of the filtrate at high temperatures. All mud examples given were prepared and formulated as described hereafter and tested at 300° F. with a top pressure of 600 PSI and a back pressure of 100 PSI for a differential pressure of 500 PSI for a test period of 30 minutes.

PREPARATION OF INTERMEDIATE DIAMIDE AND COMPLETED SURFACTANT

Although the reaction of the intermediate diamide product utilized to prepare the surfactant of the present invention may involve side reactions, such as oxidation, the major features of the surfactant synthesis are: (1) the reaction of the selected polyamine with the selected fatty acid; and (2) subsequent reaction of the diamide intermediate with the selected tricarboxylic acid. When, for example, the polyamine which is selected is DETA, and the fatty acid is tall oil, the reaction can be expressed as illustrated below wherein "R" is primarily unsaturated straight chain hydrocarbon groups having 17 carbon atoms.

4RCO$_2$H + 2NH$_2$CH$_2$CH$_2$NHCH$_2$CH$_2$NH$_2$ ⟶
tall oil
fatty acid

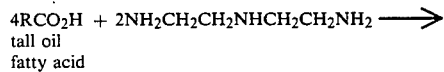

(1)

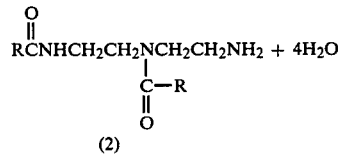

(2)

The term "diamide" refers to a mixture of structures (1) and (2), each of which possess two reacted amine groups. It may be further described as any mixture of (1) and (2) resulting from the reaction of approximately two moles fatty acid with approximately one mole DETA.

The subsequent reaction of the intermediate, when the selected tricarboxylic acid is citric acid, will result in a mixture of oligomers (3), (4), and (5) which will be referred to as oligamides. For brevity only, those oligamides resulting from the reaction of citric acid with (1) are represented. The reaction of (2) with citric acid will result in three corresponding oligamides. The final product may also include analogous salts of the intermediate and citric acid, as well as products resulting from decarboxylation and/or dehydration of these oligamides.

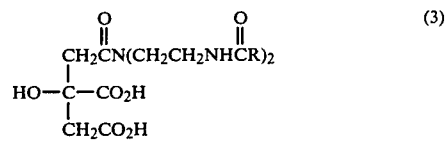
(3)

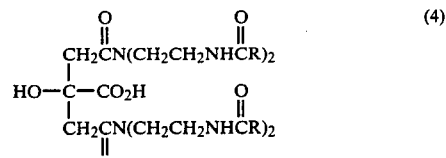
(4)

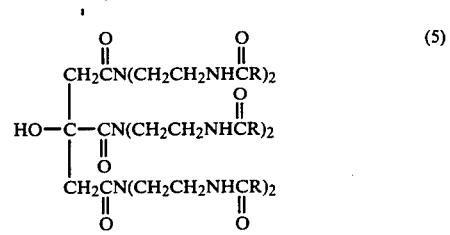
(5)

In preparing the surfactant for utilization in the present invention, the synthesis should be performed in a reactor which is equipped with a distilling head and a receiver. The reactor is charged with the selected fatty acid and the selected polyamine in the ratio of from about 1.8 to about 2.0 moles of fatty acid to about 1 mole polyamine. The selected fatty acid and the polyamine will be reacted at a temperature averaging about 165° C., but less than about 175° C. for about 75 minutes. Depending upon the design efficiency of the system, approximately 80 percent of the theoretical quantity of water should be collected.

With the reaction mixture maintained at about 140° C. to 160° C., the reactor is charged with from about 0.60 to about 0.75 moles of the selected tricarboxylic acid to produce an oligomeric end product. The tricarboxylic acid may be required to be added incrementally, in order to abate foaming. The tricarboxylic acid addition may require as long as 45 minutes. After complete addition of the selected tricarboxylic acid, the reaction is maintained at a temperature for about 45 minutes from between about 145° C. and about 165° C. It should be noted that some water will be distilled during the reaction of the tricarboxylic acid with the diamide intermediate.

After the reaction is completed, the resulting surfactant product may be diluted to a given concentration of, for example, about 70 w/w percent with a pour point depressant, such as nontoxic mineral oil, and/or methanol, or other surfactant.

PREPARATION OF WATER-IN-OIL EMULSION DRILLING FLUID USING PRESENT SURFACTANT

The invention contemplates utilization of the surfactant, prepared as above-described, in the preparation of a water-in-oil, or invert, emulsion drilling fluid. The oil phase or continuous phase can comprise any mineral oil or other hydrocarbon conventionally utilized in forming water-in-oil emulsion drilling fluids. For example, diesel oil, crude oil, gas oil, kerosene or the like may be utilized. The amount of water utilized should be within the range of from between about 5 to about 40 parts by volume, and preferably within the range of from between about 10 to about 30 parts by volume, on the basis of 100 parts equalling the liquid phase of the drilling fluid composition. The water phase or disbursed phase of the emulsion can consist of fresh water, salt water, sea water, or brine. The presence of sodium chloride, calcium chloride, calcium carbonate, or calcium sulfate generally has no adverse effect upon the stability of the emulsion which is produced. The oil concentration should be within the range of from between about 60 to about 95 parts by volume, and, preferably, within the range of from between about 70 to about 90 parts by volume, on the basis of 100 parts equalling the liquid phase of the drilling fluid composition. Of course, the exact concentration of oil and water depends upon the particular application for which the emulsion drilling fluid is to be utilized. Typically, when mineral seal oil is utilized as the oil; 30 w/w percent calcium chloride solution is used as the aqueous phase; and the finished surfactant is prepared utilizing DETA, tall oil and citric acid, a satisfactory water-in-oil emulsion drilling fluid can be prepared based upon a sample as follows: 455 cm³ oil; 6 cm³ surfactant; 84 cm³ of 30 w/w percent calcium chloride solution; 4 grams organophilic clay; and 676 grams barite.

The drilling fluid which is prepared may be used for the drilling or completion or workover of a well by circulating the drilling fluid in the well in any amount necessary to obtain satisfactory results. Under most conditions, concentrations of surfactants from 1.5 ppb (pounds per 42-gallon barrel) to 20 ppb will be sufficient to provide a satisfactory drilling fluid.

The invention will be further appreciated from a reading of the illustrative example, which follow:

In the working examples below, a determination of effectiveness of water-in-oil emulsion drilling fluid may be found in the measurement of filtrate before and after "hot rolling." Typically, in determining satisfactory filtration properties, the total filtrate of the sample should contain no more than about 25 cubic centimeters before "hot rolling" and no more than about 30 cubic centimeters after "hot rolling." Additionally, there should be no free water or emulsion in the filtrate before "hot rolling," and no free water or emulsion in the filtrate after "hot rolling."

EXAMPLE I

In the present Example I, an intermediate diamide was prepared, as described above. Tall oil with a molecular weight of 289 was utilized as the selected fatty acid, while DETA, having a molecular weight of 103, was utilized as the selected polyamine. The diamide was made by reacting 0.606 moles tall oil with 0.309 moles DETA. The intermediate was subsequently reacted with 0.238 moles citric acid as described above. The product was then diluted to 70 percent (w/w) concentration with solvent. The diluted product had an acid value of 41 and a total amine value of 14, the acid value and the total amine value being calculated as described above.

A total of 4.2 cm³ of the surfactant, as described and prepared above, was added to 235 cm³ of mineral seal oil and stirred for 5 minutes. Thereafter, 58.5 cm³ of 30 percent (w/w) calcium chloride solution were added and stirred for 10 minutes. "$ES_1$" was determined. Thereafter, 4.0 grams of organophilic clay were added to the test sample and mixed for 15 minutes. "$ES_2$" was determined. Subsequently, 236 grams of barite corresponding to a 12 pound per gallon mud were added to the sample and mixed therein. "$ES_3$" was measured. Thereafter, an additional 140 grams of barite were added to the sample and mixed for 10 minutes. "$ES_4$" was measured. Thereafter an additional 170 grams of barite were added and mixed for 10 minutes. "$ES_5$" was then measured.

The preparation of muds for filtration control and barite settling tests was achieved as follows. A model 1-LV Gifford Wood Homogenizer Mixer operating at 65 volts AC was used in a one liter steel flask. A total of 455 cm³ mineral seal oil was added to the flask. After starting the mixer, 6 cm³ of 70 w/w percent surfactant were added and mixed for 5 minutes. A total of 84 cm³ of 30 percent (w/w) calcium chloride solution was added and mixed for 10 minutes. A total of 4 grams organophilic clay was added and also mixed for 10 minutes. Finally, 676 grams of barite were added and mixed for 10 minutes. The final mud with an 85:15 oil-water ratio and a weight of 14 pounds per gallon was split into two, one-barrel-equivalent (350 cm³) sample sizes. One sample was tested initially while the second sample was hot rolled in a steel bomb for 16 hours at 300° F. with 350 PSI of nitrogen pressure applied during the hot roll interval. Upon cooling and release of pressure the ES readings, total amine value and acid value, together with plastic viscosity, yield point, and high temperature-high pressure filtrate data were taken and are set forth in the column identified as Example I-A in Table I. Samples of surfactants made on a commercial scale utilizing the same raw material additives were also evaluated in the 14 lb/gal mud. The results of the tests of these samples are indicated as Examples I-B and I-C in Table I.

TABLE I

| Example Number | MINERAL SEAL OIL | | | | DIESEL OIL |
| --- | --- | --- | --- | --- | --- |
| | 1-A | 1-B | 1-C | 1-D | 1-E |
| $ES_1$ (Volts) | 84 | 84 | 70 | 52 | — |
| $ES_2$ (Volts) | 176 | 170 | 160 | 132 | — |
| $ES_3$ (Volts) | 864 | 916 | 890 | 728 | — |
| $ES_4$ (Volts) | 1048 | 1112 | 1080 | 828 | — |
| $ES_5$ (Volts) | 1108 | 1212 | 1170 | 712 | — |
| Acid Value | 41 | 46 | 41 | 17 | — |

TABLE I-continued

| mg KOH/g Amine Value mg KOH/g | 14 | | 16 | | 15 | | 28 | | — | |
|---|---|---|---|---|---|---|---|---|---|---|
| Hours Hot Rolled @ 300° F. | Initial | After 16 hrs | Initial | After 16 hrs | Initial | After 16 hrs | Initial | After 16 hrs | Initial | After 16 hrs |
| Plastic Viscosity (CP) | 21 | 22 | 22 | 22 | 23 | 21 | 16 | 20 | 16 | 22 |
| Yield Point lbF/100 ft² | 8 | 10 | 6 | 8 | 10 | 12 | 14 | 17 | 4 | 13 |
| HTHP 300° F. cm³ | 16.4 | 22 | 30 | 20.4 | 11.2 | 12.4 | 54 | 24 | 46 | 56 |
| Free Water cm³ | 0 | 0 | 0 | 0 | 0 | 0 | Trace | 0.8 | 0.8 | 1.8 |
| ES @ 75° F. volts | 1350 | 1280 | 1680 | 1380 | 1220 | 1220 | 700 | 1440 | 840 | 980 |
| Barite Settling | No | No | No | No | No | No | No | No | No | Yes |

| | DIESEL OIL | | | | | | | | |
|---|---|---|---|---|---|---|---|---|---|
| Example Number | 1-F | | 1-G | | 1-H | | 1-I | | 1-J |
| $ES_1$ (Volts) | — | | 80 | | — | | — | | 80 |
| $ES_2$ (Volts) | — | | 130 | | — | | — | | 130 |
| $ES_3$ (Volts) | — | | 330 | | — | | — | | 330 |
| $ES_4$ (Volts) | — | | 800 | | — | | — | | 800 |
| $ES_5$ (Volts) | — | | 900 | | — | | — | | 900 |
| Acid Value mg KOH/g | 20 | | 16 | | 40 | | 42 | | 16 |
| Amine Value mg KOH/g | 35 | | 35 | | 32 | | 13 | | 35 |

| Hours Hot Rolled @ 300° F. | Initial | After 16 hrs | Initial | After 16 hrs | Initial | After 16 hrs | Initial | After 16 hrs | After 16 hrs |
|---|---|---|---|---|---|---|---|---|---|
| Plastic Viscosity (CP) | 16 | 19 | 16 | 19 | 13 | 17 | 16 | 17 | 17 |
| Yield Point lbF/100 ft² | 6 | 12 | 4 | 11 | 11 | 9 | 14 | 10 | 7 |
| HTHP 300° F. cm³ | 42 | 60 | 50 | 66 | 36 | 54 | 14.0 | 22.4 | 26 |
| Free Water cm³ | 0 | 2.0 | 1.0 | 4.0 | 0.8 | 2.8 | 0 | 0 | Trace |
| ES @ 75° F. volts | 1040 | 1000 | 1200 | 1320 | 1000 | 1200 | 1240 | 1200 | 1200 |
| Barite Settling | No | No | No | Yes | No | Yes | No | No | No |

A commercially available competitive sample, 1D, is an emulsifier presently used in mineral seal oil drilling fluids for the same purpose. Samples 1E, 1F, 1G, 1H are commercially available competitive emulsifiers presently available for use in diesel oil drilling fluids. Example 1-I is another commercial sample of the present invention tested in diesel oil. The absence of water in the filtrate and superior aging stability and wetting ability of the present invention in comparison to competitive products is shown in Table I. Twice the amount of competitive emulsifier as used in Example 1-G, shows performance approaching that of the present invention as given in Example 1-J in Table I.

EXAMPLE II

A surfactant was prepared, as above, but utilizing 53.6 mole percent of oleic acid as the fatty acid; 28.9 mole percent DETA as the polyamine; and 17.5 mole percent citric acid as the tricarboxylic acid. The surfactant, diluted as in Example 1, was utilized to prepare a water-in-oil emulsion in mineral seal oil as the oil phase and 30 percent (w/w) calcium chloride solution as the aqueous phase. The oil to water volume ratio was 85:15 respectively. "$ES_5$" readings were taken before and after "hot rolling" and were 780 and 1100, respectively. Total filtrate before "hot rolling" was 22 cm³ and free of water and emulsion. Total filtrate after "hot rolling" was 32 cm³ and free of water. The diluted surfactant had an acid value of 27 and a total amine value of 18.

EXAMPLE III

In the present example, the surfactant was prepared by substituting various fatty acids within the scope of the present invention, but utilizing DETA as the polyamine and citric acid as the tricarboxylic acid. The emulsion was prepared, as described above, and tested in an oil-base mud prepared as in Example II.

The results of this test, indicating that very favorable emulsions were produced utilizing the selected surfactant, are set forth in Table III below:

TABLE III

| Example Number | Fatty Acid Mole % | Polyamine Mole % | Tricarboxylic Acid Mole % | API Electrical Stability (volts) Initial | API Electrical Stability (volts) After Hot Rolling @ 300° F. | Filtrate (cm³) Before Hot Rolling Total | Filtrate (cm³) Before Hot Rolling Free Water | Filtrate (cm³) After Hot Rolling @ 300° F. Total | Filtrate (cm³) After Hot Rolling @ 300° F. Free Water | Acid Value (mg KOH/g) | Amine Value (mg KOH/g) |
|---|---|---|---|---|---|---|---|---|---|---|---|
| III-A | Oleic 53.0 | DETA 28.6 | Citric 18.4 | 880 | 880 | 22 | 0 | 24 | 0 | 27 | 16 |
| III-B | Linoleic 51.7 | DETA 28.0 | Citric 20.3 | 1280 | 1260 | 18 | 0 | 20 | 0 | 32 | 14 |
| III-C | Linolenic 51.7 | DETA 28.0 | Citric 20.3 | 1220 | 1320 | — | — | 22 | 0 | 33 | 13 |

EXAMPLE IV

In the present example, tall oil was utilized as the fatty acid and citric acid was utilized as the tricarboxylic acid in the preparation of the end surfactant with ES$_5$ and filtrate being measured as in Example III. However, one sample was prepared with triethylene tetramine (TETA). It had an acid number of 29 and a total amine value of 25. The other sample was prepared using iminobispropylamine (IBPA) and had acid and toal amine values of 38 and 23 respectively. The results, set forth below in Table IV, clearly indicate that these compositions produced surfactants having good wetting characteristics. After hot rolling, the TETA sample filtrate indicated fair surfactant performance due to the absence of free water; however, the total filtrate volume was greater than desirable, indicating an increase in the quantity of surfactant would be necessary. The IBPA sample (IV-B) demonstrated a lack of thermal stability as indicated by the presence of free water in the filtrate.

TABLE IV

| Example Number | Fatty Acid Mole % | Polyamine Mole % | Tricarboxylic Acid Mole % | API Electrical Stability (volts) Initial | API Electrical Stability (volts) After Hot Rolling @ 300° F. | Filtrate (cm³) Before Hot Rolling Total | Filtrate (cm³) Before Hot Rolling Free Water | Filtrate (cm³) After Hot Rolling @ 300° F. Total | Filtrate (cm³) After Hot Rolling @ 300° F. Free Water | Acid Value (mg KOH/g) | Amine Value (mg KOH/g) |
|---|---|---|---|---|---|---|---|---|---|---|---|
| IV-A | Tall Oil 62.0 | TETA 21.7 | Citric 16.3 | 880 | 1000 (No Bomb Settling) | — | — | 42 | 0 | 29 | 25 |
| IV-B | Tall Oil 51.8 | IBPA 27.9 | Citric 20.3 | 960 | 1100 (No Bomb Settling) | 32 | 0 | 30 | 2 | 38 | 23 |

EXAMPLE V

When oligamides of tall oil, DETA, and fumaric acid were used as surfactants in relaxed filtrate drilling fluid systems, the superior thermal stability of the surfactants formulated with citric acid was demonstrated by the relatively constant filtrate volumes and absence of free water before and after hot rolling (Table V).

It should be noted that fumaric acid contains two carboxyl groups, and therefore surfactants formulated with fatty acid, polyamine, and fumaric acid do not come within the scope of the present invention.

TABLE V

| Example Number | Tall Oil Mole % | DETA Mole % | Acid Mole % | API (Volts) Electrical Stability Initial | API (Volts) Electrical Stability After Hot Rolling @ 300° F. | Filtrate cm³ Before Hot Rolling Total | Filtrate cm³ Before Hot Rolling Free Water | Filtrate cm³ After Hot Rolling @ 300° F. Total | Filtrate cm³ After Hot Rolling @ 300° F. Free Water |
|---|---|---|---|---|---|---|---|---|---|
| | | | DIESEL | | | | | | |
| V-A | 53.6 | 28.9 | Fumaric 17.5 | 1080 | 1040 | 24 | 0 | 44 | 1.2 |
| V-B | 53.0 | 28.6 | Fumaric 18.4 | 1060 | 900 | 26 | 0 | 36 | 0.2 |
| V-C | 49.4 | 26.6 | Fumaric 24.0 | 1160 | 980 | 20 | 0 | 46 | 1.2 |
| V-D | 56.4 | 30.4 | Citric 13.2 | 1000 | 1060 | 22 | 0 | 22 | 0 |
| V-E | 51.8 | 27.9 | Citric 20.3 | 2000 | 1480 | 15 | 0 | 14 | 0 |
| | | | MINERAL SEAL OIL | | | | | | |
| V-F | 49.4 | 26.6 | Fumaric 24.0 | 1060 | 840 | — | — | 38 | 0 |
| V-G | 53.6 | 28.9 | Citric 17.5 | 900 | 1080 | — | — | 19 | 0 |
| V-H | 51.8 | 27.9 | Citric | 1220 | 1220 | 11 | 0 | 12 | 0 |

TABLE V-continued

| Example Number | Tall Oil Mole % | DETA Mole % | Acid Mole % | API (Volts) Electrical Stability | | Filtrate cm³ | | | |
|---|---|---|---|---|---|---|---|---|---|
| | | | | Initial | After Hot Rolling @ 300° F. | Before Hot Rolling Total | Free Water | After Hot Rolling @ 300° F. Total | Free Water |
| | | | 20.3 | | | | | | |

EXAMPLE VI

In the present example, a surfactant prepared, as described above, was used to compound a water-in-oil drilling fluid system. The selected fatty acid was tall oil. The selected polyamine was tetraethylene pentamine (TEPA). The tricarboxylic acid was citric acid. In the preparation of the surfactant, an amount of citric acid coming within the required mole percentage ratio of the present invention, i.e. 19 percent was utilized and produced a drilling fluid having poor initial filtrate values. After hot rolling electrical stability and filtrate results improved indicating thermal stability but poor solubility of the surfactant. However, when the amount of citric acid was reduced to 14.3 mole percent and 11.1 mole percent, respectively, an unsatisfactory emulsion was produced. The results of this test are set forth in Table VI below.

TABLE VI

| Example Number | Fatty Acid Mole % | Polyamine Mole % | Tricarboxylic Acid Mole % | API Electrical Stability (volts) | | Filtrate (cm³) | | | |
|---|---|---|---|---|---|---|---|---|---|
| | | | | Initial | After Hot Rolling @ 300° F. | Before Hot Rolling Total | Free Water | After Hot Rolling @ 300° F. Total | Free Water |
| VI-A | Tall Oil 53.8 | TEPA 27.2 | Citric 19.0 | 340 | 740 | 80 (10 minutes) | 60 | 72 (30 minutes) | 3 |
| VI-B | Tall Oil 56.9 | TEPA 28.8 | Citric 14.3 | Emulsion broke | | | | | |
| VI-C | Tall Oil 59.0 | TEPA 29.9 | Citric 11.1 | Emulsion broke | | | | | |

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A surfactant for a water-in-oil emulsion subterranean well drilling fluid, said fluid having present therein a liquid hydrocarbon base and an aqueous phase, said surfactant comprises: an oligamide prepared by reacting from between about 20 mole percent and about 35 mole percent of a polyalkylene polyamine having two or more alkylene groups separated by nitrogen atoms and from between about 30 mole percent and about 70 mole percent of a fatty acid having from between about six to about 20 carbon atoms therein, said polyamine and fatty acid being reacted to form a diamide intermediate product said intermediate product being further reacted with from between about 15 mole percent to about 35 mole percent of a tricarboxylic acid selected from citric acid and trimellitic acid to form an oligamide, said surfactant, when diluted to about 70 percent w/w concentration with a suitable solvent, having an acid value from about 26 to about 46, said surfactant having a total amine value from between about 10 to about 30, the drilling fluid produced with said surfactant having an electrical stability measurement in accordance with the API Electrical Stability Test of about 1,000 volts.

2. The surfactant of claim 1 wherein the polyamine is diethylenetriamine.

3. The surfactant of claim 1 wherein the fatty acid is tall oil.

4. The surfactant of claim 1 wherein the tricarboxylic acid is citric acid.

5. A surfactant for a water-in-oil subterranean well drilling fluid, said fluid having present therein a liquid hydrocarbon base and an aqueous phase, said surfactant comprising: an oligamide prepared from reacting from between about 20 mole percent and 35 mole percent of a polyalkylene polyamine having two or more alkaline groups separated by nitrogen atoms, and from between about 30 mole percent and about 70 mole percent of a fatty acid having from between about 6 to about 20 carbon atoms therein, said polyamine and fatty acid being reacted to form a diamide intermediate product, said diamide intermediate product being reacted with from between about 15 mole percent and about 35 mole percent of a tricarboxylic acid selected from citric acid and trimellitic acid to form an oligamide, said surfactant, when diluted to about 70 percent w/w concentration with a suitable solvent, having an acid value from between about 26 to about 46, surfactant having a total amine value from between about 10 to about 30, the invert drilling fluid produced with said surfactant having an ES3 of at least about 400 volts and an E5 being greater than about 1,000 volts.

6. The surfactant of claim 5 wherein the polyamine is diethylene triamine.

7. The surfactant of claim 5 wherein the fatty acid is tall oil.

8. The surfactant of claim 5 wherein the tricarboxylic acid is citric acid.

* * * * *